United States Patent
Levey

(10) Patent No.: US 6,189,193 B1
(45) Date of Patent: Feb. 20, 2001

(54) METHOD FOR FASTENING BLIND ANCHOR

(75) Inventor: Kenneth Levey, Island Lake, IL (US)

(73) Assignee: Illinois Tool Works Inc., Glenview, IL (US)

(*) Notice: Under 35 U.S.C. 154(b), the term of this patent shall be extended for 0 days.

(21) Appl. No.: 09/407,152

(22) Filed: Sep. 28, 1999

(51) Int. Cl.[7] .............................. B23Q 17/22; B23P 19/10; B23P 17/00; B25G 3/14

(52) U.S. Cl. ...................... 29/417; 29/407.1; 29/432.2; 29/896.6; 403/27

(58) Field of Search .................................. 29/417, 407.01, 29/407.09, 432.2, 798, DIG. 105, 896.6, 163.6, 407.1; 403/13, 27

(56) References Cited

U.S. PATENT DOCUMENTS

| | | |
|---|---|---|
| 3,502,129 | 3/1970 | Negoro . |
| 3,802,476 | 4/1974 | Hoadley . |
| 4,279,341 * | 7/1981 | Pleickhardt . |
| 4,293,261 * | 10/1981 | Frano . |
| 4,325,178 * | 4/1982 | Pruechs . |
| 4,595,325 | 6/1986 | Moran et al. . |
| 4,647,263 * | 3/1987 | Macfee, Jr. et al. . |
| 4,753,561 | 6/1988 | Betterton et al. . |
| 4,925,350 * | 5/1990 | Kolseth . |
| 5,323,531 * | 6/1994 | Leistner et al. ........................ 29/798 |
| 5,439,336 | 8/1995 | Muller . |
| 5,531,552 | 7/1996 | Takahashi et al. . |
| 5,549,430 | 8/1996 | Takahashi et al. . |
| 5,553,936 * | 9/1996 | Dasher et al. . |

* cited by examiner

Primary Examiner—S. Thomas Hughes
Assistant Examiner—Eric Compton
(74) Attorney, Agent, or Firm—John P. O'Brien; Mark W. Croll; Donald J. Breh

(57) ABSTRACT

A method and apparatus for fastening anchoring devices having a screw aperture therethrough to a portions of panels devoid of openings including fastening the anchoring device to a one side of the panel, and forming an anchoring device locating indicium on another side of the panel opposite the anchoring device and in alignment with the aperture thereof without forming an opening through the panel.

26 Claims, 2 Drawing Sheets

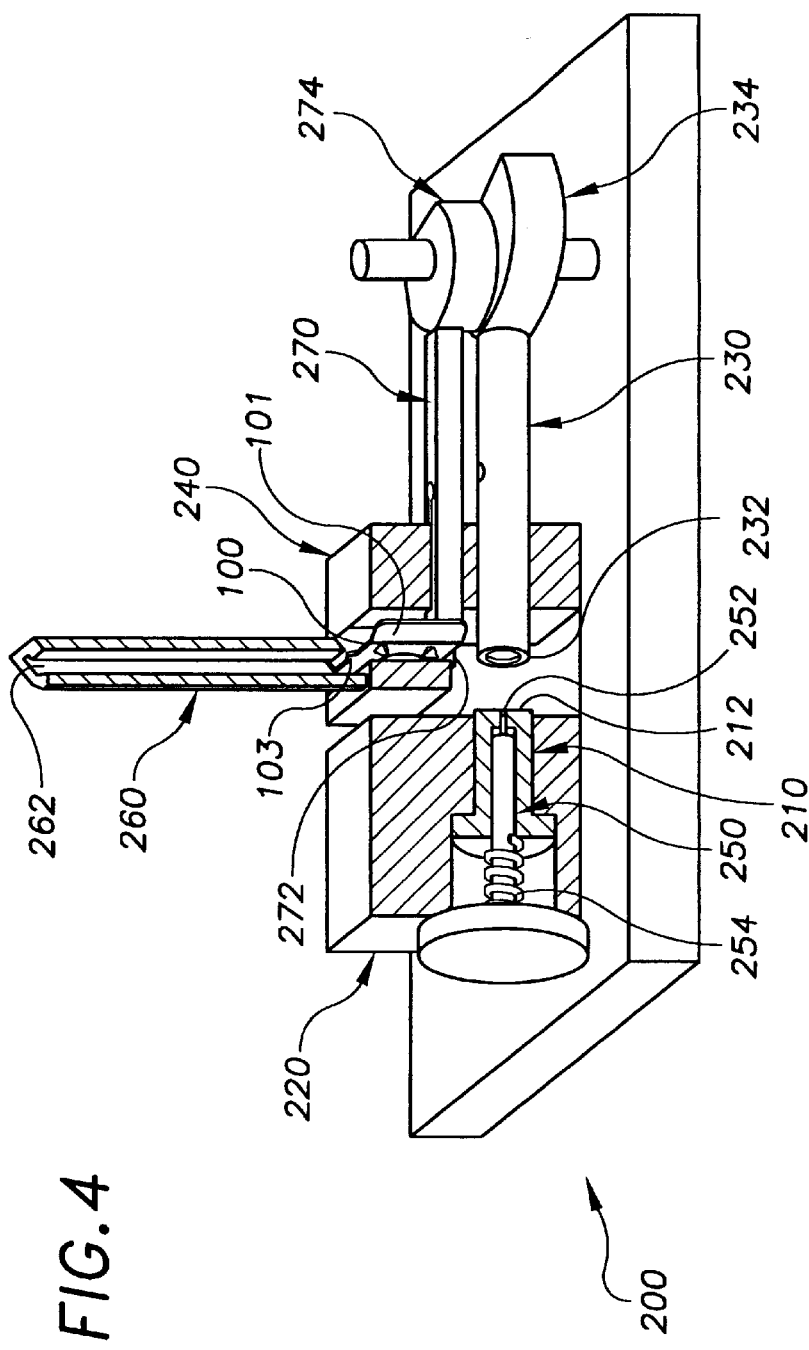

METHOD FOR FASTENING BLIND ANCHOR

CROSS REFERENCE TO RELATED APPLICATIONS

The present application is related to co-pending U.S. Application Ser. No. 09/407,744 filed on Sept. 28, 1999 entitled "Blind Anchor And System", which is assigned commonly herewith and incorporated herein by reference.

BACKGROUND OF THE INVENTION

The invention relates generally to methods for fastening anchoring devices, and more particularly to methods and apparatuses for blindly fastening anchors to panels.

Anchors fastenable to panels for support are known generally. U.S. Pat. No. 3,802,476 entitled "Screw Anchor", for example, discloses a screw anchoring device adhered over an opening through a wall panel on one side thereof for subsequently accepting a screw disposed through the opening from an opposite side of the wall panel.

The anchoring device of U.S. Pat. No. 3,802,476 includes more particularly a plate member having angled wings on opposite edges thereof and a central aperture, about which is formed a helical screw impression protruding from the same side thereof as the wing members. Two tabs located on opposite sides of the helical screw impression protrude at right angles from the side of the plate member opposite the side thereof from which the helical screw impression protrudes, and a pressure sensitive adhesive pad or tape is adhered to the side of the plate member from which the tabs protrude. The tabs protrude through the adhesive pad and facilitate alignment of the anchoring device aperture with the panel opening. Thereafter, a screw disposed into the panel opening from the side thereof opposite the anchoring device is threadably engageable with the helical depression formed about the aperture of the anchoring device, for example to mount a bracket or some other utility member to the panel.

A popular application for the anchoring device of U.S. Pat. No. 3,802,476, among others, is for mounting shelf supporting brackets on interior liners of refrigerators. In this application, the anchoring devices are mounted over corresponding openings on a side of the liner that is not visible from the interior of the refrigerator. The assembly of the anchoring device is performed manually by inserting the tabs in the liner opening and then pressing the anchoring device against the side of the liner until the pressure sensitive pad or tape adheres the anchoring device thereto. The anchoring device seals the opening through the liner to prevent insulating foam injected between the liner and an outer structure of the refrigerator from contaminating the interior thereof during manufacturing. Besides aligning the anchoring device, the opening through the liner indicates the location of the anchoring device for subsequently fastening a screw thereto from the interior of the refrigerator. Occasionally, however, openings through the liner are not completely covered or properly sealed by anchoring devices, thus allowing insulating foam to contaminate the interior of the refrigerator, which is undesirable.

The present invention is drawn toward advancements in the art of fastening anchoring devices, or anchors, to panels and indicating the location thereof.

An object of the invention is to provide novel methods for fastening anchoring devices to panels that overcome problems in the art.

Another object of the invention is to provide novel methods for fastening anchoring devices to panels that are reliable and economical.

A further object of the invention is to provide novel methods for fastening anchoring devices to one side of a panel and forming an anchoring device locating indicium on another side thereof opposite the anchoring device.

Yet another object of the invention is to provide novel methods for blindly fastening anchoring devices to one side of a panel and forming anchor device locating indicium on another side thereof opposite the corresponding anchoring device to indicate the location of the anchoring device without the use of any openings through the panel.

It is another object of the invention to automate the fastening of anchoring devices to panels, and in applications where anchoring device locating indicium are desired, to automate the formation thereof on the panel opposite the anchoring device.

A more particular object of the invention is to provide methods for fastening anchoring devices having a screw aperture therethrough to portions of panels devoid of openings comprising generally fastening an anchoring device to one side of the panel, and forming an anchoring locating indicium on another side of the panel opposite the anchoring device in alignment with the aperture thereof without forming an opening through the panel.

Another more particular object of the invention is to provide methods for fastening anchoring devices onto panels comprising generally fastening an anchoring device to one side of the panel with a transfer punch engaged with the anchoring device, supporting the panel opposite the anchoring device with a die when fastening the anchoring device to the panel, and forming an anchoring device locating indicium on the panel opposite the anchoring device without forming an opening through the panel.

Yet another more particular object of the invention is to provide methods for fastening anchoring devices onto panels comprising generally fastening an anchoring device to the panel with a transfer punch engaged with the anchoring device and a die engaged with the panel opposite the anchoring device, and forming an anchoring device locating indicium on the panel opposite the anchoring device with a divot punch.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 3 is a flow diagram for fastening an anchoring device to a panel according to an exemplary embodiment of the invention.

FIG. 4 is an exemplary apparatus for fastening anchoring devices to panels.

DETAILED DESCRIPTION OF THE INVENTION

According to the present invention generally, an anchoring device is fastened to a side portion of a panel, preferably devoid of openings therethrough, so that the anchoring device is not visible from an opposite side of the panel. An anchoring device locating indicium is formed on the side of the panel opposite the anchoring device so that the location of the anchoring device may be ascertained from the blind side of the panel, without the use of any openings through the panel.

Anchoring devices blindly fastenable to panels and suitable for use according to the methods of the present invention comprise generally a fastening member disposed on one side thereof for fastening the anchoring device to a side of the panel. The anchoring device for example may be adhered to a surface of the panel or a portion thereof may penetrate partially into the panel. Anchoring devices that are blindly fastenable to a side of the panel thus do not have any structure or portion thereof protruding through the opposite side of the panel. Anchoring devices of this type have application in the manufacture of refrigerators among other applications where it is desirable to hide the anchoring device and eliminate openings through the panel. The methods of the present invention however are also applicable to anchoring devices that protrude through the opposite side of the panel, which alternative anchoring device mounting configurations are suitable for use in other applications.

Anchoring devices fastenable to panels and suitable for use according to the methods of the present invention may also comprises a utility member fastening portion, for example a threaded aperture for accommodating a screw disposed through the panel from the side thereof opposite the anchoring device. Anchoring devices of this type also have application in the manufacture of refrigerators, for example to mount brackets on an interior side of the refrigerator liner. The methods of the present invention however are also applicable to anchoring devices that have utility member fastening portions besides threaded openings, or that do not have any utility member fastening portion, which alternative anchoring device configurations are useful for other applications.

Figure 1:
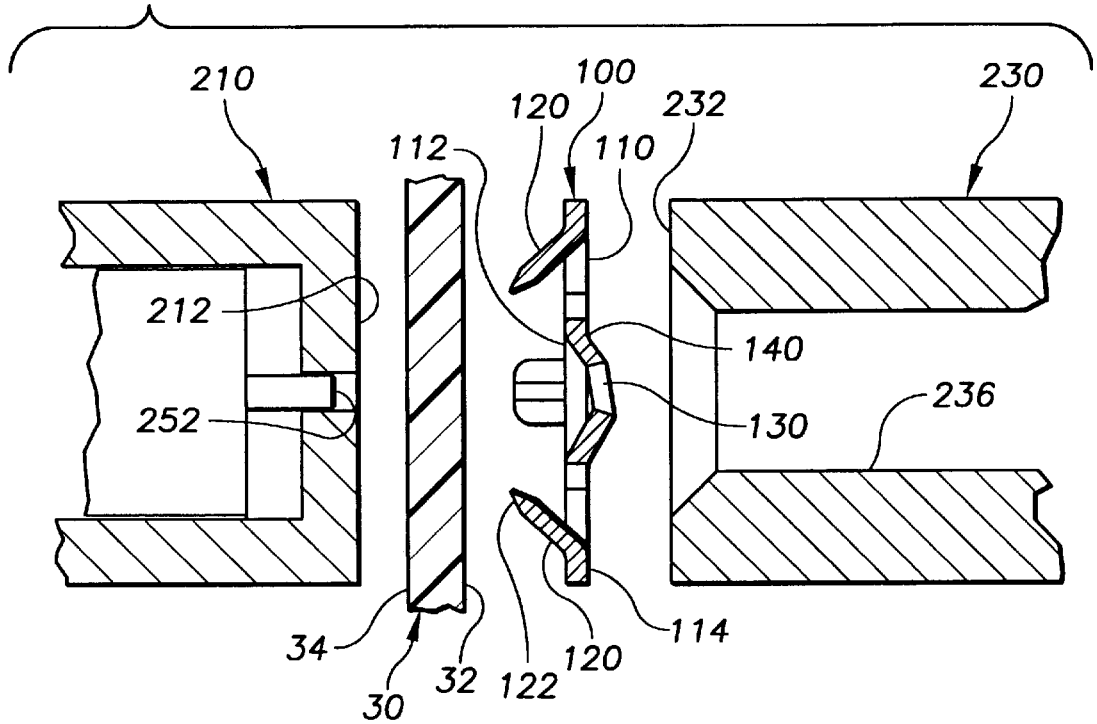
FIG. 1 is a partial sectional view of an anchoring device prior to fastening to a panel according to an exemplary embodiment of the invention.

FIG. 1 illustrates an exemplary anchoring device 100 not yet fastened to a panel 30. The anchoring device 100 comprises generally a plate member 110 having a fastening member disposed on a first side 112 thereof suitable for fastening the anchoring device to a first side 32 of the panel. The anchoring device also comprises a utility member fastening portion in the form of an aperture 130 therethrough having a helical depression 140 formed thereabout and protruding from a second side 114 of the anchoring device to form a threaded opening for receiving a screw.

The fastening member of the exemplary anchoring device 100 of FIG. 1 comprises a plurality of teeth 120 having a sharpened distal tip portion 122 protruding from the first side 112 thereof at a non-perpendicular angle relative thereto. The plurality of teeth are disposed on the anchoring device and about the aperture therethrough. The plurality of teeth may converge toward or diverge away from each other.

These and other aspects of the exemplary anchoring device 100 of FIG. 1 are disclosed more fully in the referenced co-pending patent application entitled "Blind Anchor And System", which is assigned commonly herewith and incorporated herein by reference. Other alternative configurations of the anchoring device 100 suitable for use according to the methods of the present invention are also disclosed in the referenced co-pending patent application entitled "Blind Anchor And System" incorporated herein by reference.

Another anchoring device suitable for use according to the methods of the present invention is the prior art anchoring device disclosed in the referenced U.S. Pat. No. 3,802,476 entitled "Screw Anchor", wherein the fastening member thereof is a pressure sensitive adhesive pad or tape disposed on one side of the plate member and which is adhered to the side of the panel upon application of pressure to the anchoring device.

Figure 2:
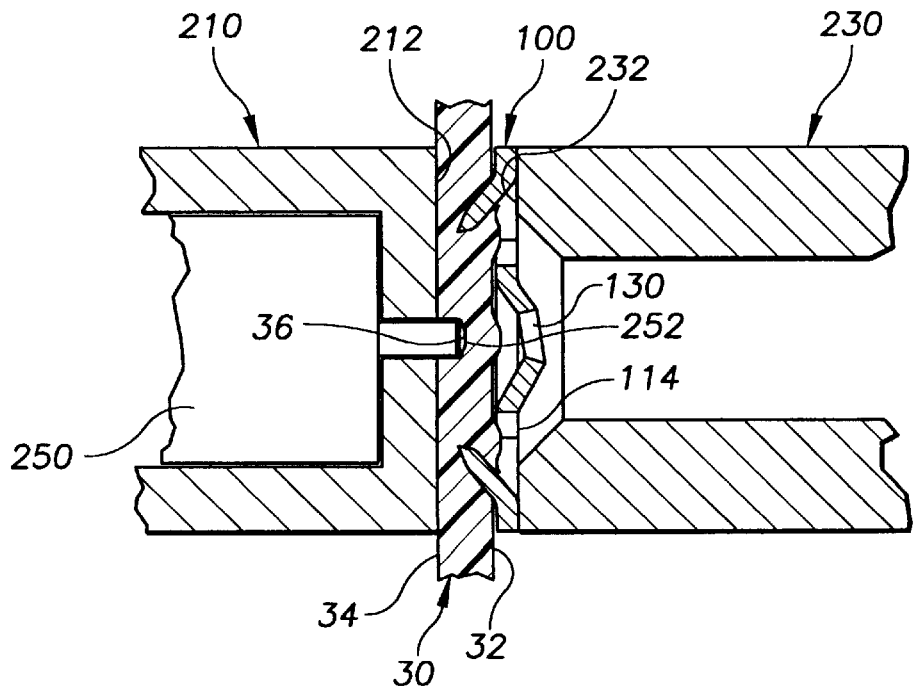
FIG. 2 is a partial sectional view of anchoring device blindly fastened to a panel with a locating indicium on an opposite side thereof.

In FIG. 2, the anchoring device 100 is fastened blindly to one side 32 of the panel 30 so that it is not visible from the other side 34 thereof. The panel 30 also has formed in the second side 34 thereof opposite the anchoring device 100 an anchoring device locating indicium in the form of a depression 36, which is aligned with the aperture 130 of the anchoring device. Alternatively, the anchoring device locating indicium may be a relief protruding from the second side 34 of the panel or some other visible but non-tactile indicium as discussed more filly in the reference co-pending patent application entitled "Blind Anchor And System" incorporated herein by reference.

The process flow diagram of FIG. 3 illustrates steps for fastening an anchoring device to a first side of the panel, and for forming an anchoring device locating indicium on a second side thereof opposite the anchoring device. As indicated, these steps may be performed generally in any order, and in one exemplary mode of practicing the invention the steps are performed simultaneously or partially overlappingly time, as discussed below.

In applications where the anchoring device has an aperture or other utility member fastening portion, the anchoring device locating indicium may be located in some particular relation thereto. In FIG. 2, for example, the depression 36 is in alignment with the aperture 130 of the anchoring device to facilitate threaded engagement of the screw therewith.

The anchoring device locating indicium may also be desirable in applications where the anchoring device protrudes through opposite sides of the panel, for example the portions of the anchoring device protruding through the panel may not locate the aperture or other utility member fastening portion of the anchoring device with sufficient accuracy.

The anchoring device is preferably installed onto the panel with a transfer punch that engages the second outer side of the anchoring device and drives it against the panel, thereby fastening the anchoring device to the panel by means of the fastening member. The anchoring device locating indicium is preferably formed on the opposite side of the panel with a divot punch engaged with either the first or second side of the panel, depending upon the configuration of the anchoring device and upon whether a depression or relief is desired.

FIG. 1 illustrates an exemplary apparatus 200 for installing anchoring devices onto a panel, and for forming an anchoring device locating indicium on the panel opposite the anchoring device. The apparatus comprises generally a forming die 210 having a die end 212 positioned opposite a punch 230 having a punch end 232. The die 210 is supported for example in a die block 220 or by other suitable means, and the punch 230 is disposed reciprocatably for example in a punch block 240 or other suitable means also known to those of ordinary skill in the art. FIG. 1 illustrates the die end 212 of the forming die 210 positioned opposite the punch end 232 prior to installation of the anchoring device 100, and FIG. 2 illustrates the cooperative relation of these elements during and after installation of the device.

In FIG. 2, generally, the anchoring device 100 is installed onto the panel 30 by engaging the second side 114 of the anchoring device positioned adjacent the panel 30 with the end portion 232 of the transfer punch 230 upon axially moving the punch 230 toward the anchoring device while supporting the second side 34 of the panel 30 opposite the anchoring device 100 with die end 212. In the exemplary embodiment, the punch 210 causes the teeth of the anchoring device to penetrate the panel, but in other embodiments the punch may adhere a pressure sensitive adhesive pad of the anchoring device onto the panel or invoke, apply or operate some other fastening member of the anchoring device.

In the exemplary apparatus 200 of FIG. 4, the punch 230 is operated or moved into engagement with the anchoring device by a cam 234, but in other embodiments the punch may be operated pneumatically by other known actuation means. The punch 230 may be returned to its rest position or moved away from the anchoring device after installation by a spring member or other means known to those of ordinary skill in the art. Also, in FIG. 1, the exemplary punch 230 has a partially hollow core 236 to accommodate the helical depression 140 protruding from the second side 114 of the anchoring device and is thus disposed about the helical depression during installation of the anchoring device.

The exemplary apparatus 200 of FIG. 4 also comprises a divot punch 250 located generally concentrically within the die 210 and fixed relative thereto. The divot punch 250 has a punch end 252 that protrudes from the die end 212 while the anchoring device is installed onto the panel by the punch 230. FIG. 2 illustrates the punch end 252 forming the anchoring device locating indicium or depression 36 on the second side 34 of the panel 30. The divot punch end 252 is preferably sized to protrude from the die end 212 only so far as is required to form the depression 36 in the panel without forming an opening through the panel.

In FIG. 4, the exemplary die 210 is reciprocatably disposed in the die block 220 relative to the fixed divot punch 250. The die 210 is also axially biased by a spring member 254 relative to the divot punch 250 so that the divot punch end 252 does not protrude from the die end 212 until sufficient pressure is applied thereto by the punch 230 during installation of the anchoring device. The strength of the spring member 254 is selected so that the teeth of the anchoring device at least partially penetrate into the first side 32 of the panel before the depression 36 is formed in the second side 34 thereof, thereby ensuring accurate alignment of the depression 36 and the screw aperture 130 of the anchoring device.

The exemplary apparatus 200 of FIG. 4 also comprises a magazine 260 for feeding anchoring devices disposed in a channel 262 thereof and individually dispensing the anchoring devices for positioning adjacent a panel, not shown in FIG. 4, prior to installation. The anchoring devices may be fed from the magazine channel 262 by gravity or spring bias or magnetic or mechanical or other feeding means known to those of ordinary skill in the art. The anchoring devices are subsequently held or positioned adjacent the panel by magnetic or mechanical or vacuum or other positioning means also known to those of ordinary skill.

FIG. 4 illustrates an exemplary anchoring device 100 having a plurality of teeth protruding therefrom in the channel 262 of the magazine 260. In other embodiments, however, the magazine 260 may feed anchoring devices having an adhesive pad or tape or other types of fastening members, as suggested above. Depending on the configuration of the anchoring device, it may be desirable to include angled wings 101 on the anchoring device and to configure the magazine channel for feeding the anchoring device with the wings thereon through the magazine, for example where it is desirable to feed an anchoring device having an adhesive pad on one side thereof. In other embodiments, however, the channel need not be configured for accommodating angled wings, for example for feeding anchoring devices having the configuration illustrated in FIGS. 1 and 2 without the angled wings.

The exemplary apparatus 200 of FIG. 4 also comprises a shear punch 270 having a shearing end 272 for shearing individual anchoring devices from a strip of anchoring devices interconnected by frangible tabs 103 disposed and fed along the magazine 260. In operation, as the strip of interconnected anchoring devices are fed through the magazine, the end most anchoring device is positioned for separation by the shearing end 272, whereupon the punch 270 is moved axially by a cam 274 to separate the endmost anchoring device from the strip. The shearing punch 270 may be returned to its rest position by a spring member or other means known to those of ordinary skill in the art. In other embodiments, the punch 270 may be operated pneumatically by other known actuation means.

FIG. 4 illustrates, for clarity, only a single anchoring device 100 having a severable tab 103 on opposite ends thereof, only one of which is illustrated. The tabs interconnect the anchoring device to adjacent anchoring devices. Thus configured, a strip of interconnected anchoring devices may be formed into a coil which is convenient for storage and handling. The strip of interconnected anchoring devices may also be readily fed into the magazine 260 of the apparatus 200 for automated installation operations. Anchoring devices interconnected in this manner may be formed in stamping operations as is known to those of ordinary skill in the art, the formation of which is discussed generally in the referenced co-pending patent application entitled "Blind Anchor And System".

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A method for fastening an anchoring device having a screw aperture therethrough onto a portion of a panel devoid of openings, comprising:
   fastening a first side of the anchoring device to a first side of the panel;
   forming an anchoring device locating indicium on a second side of the panel opposite the anchoring device and in alignment with the aperture thereof without forming an opening through the panel.

2. The method of claim 1, fastening the anchoring device to the first side of the panel without any portion of the anchoring device extending through the panel beyond the second side thereof.

3. The method of claim 1, installing the anchoring device onto the panel with a transfer punch engaged with a second side of the anchoring device, and forming the anchoring device locating indicium on the panel with a divot punch.

4. The method of claim 1, fastening the anchoring device to the panel with a plurality of teeth protruding from the first side of the anchoring device at a non-perpendicular angle relative to the anchoring device and into the first side of the panel.

5. The method of claim 1, installing the anchoring device onto the panel with a transfer punch engaged with a second side of the anchoring device and a die engaged with the second side of the panel opposite the anchoring device, and forming the anchoring device locating indicium on the panel with a divot punch engaged with the second side of the panel.

6. The method of claim 1, the screw aperture is formed in a helical depression protruding from the second side of a plate member of the anchoring device, fastening the anchoring device to the panel with a plurality of teeth each having a sharpened tip portion protruding from the first side of the plate member and disposed about the screw aperture thereof, the plurality of teeth oriented at a non-perpendicular angle relative to the plate member and extending only partially into the first side of the panel after installation.

7. The method of claim 6, installing the anchoring device onto the panel with a transfer punch engaged with a second side of the plate member about the aperture thereof, supporting the panel opposite the anchoring device with a die engaged with the second side of the panel during installation of the anchoring device, forming the anchoring device locating indicium as a depression on the second side of the panel with a divot punch.

8. The method of claim 7, forming the depression on the second side of the panel while installing the anchoring device on the first side thereof.

9. The method of claim 7, feeding the anchoring device from a magazine into a position between the transfer punch and the die before installing the anchoring device onto the panel.

10. The method of claim 9, severing the anchoring device from a strip of anchoring devices in the magazine before installing the anchoring device onto the panel.

11. A method for fastening an anchoring device onto a panel, comprising:
fastening a first side of the anchoring to a first side of the panel with a transfer punch engaged with a second side of the anchoring device;
supporting a second side of the panel opposite the anchoring device with a die when fastening the anchoring device to the panel;
forming an anchoring device locating indicium on the second side of the panel opposite the anchoring device without forming an opening through the panel.

12. The method of claim 11, forming the anchoring device locating indicium on the panel with a divot punch.

13. The method of claim 11, fastening the anchoring device to the first side of the panel without any portion of the anchoring device extending through the panel beyond the second side of the panel.

14. The method of claim 11, fastening the anchoring device to the panel with a plurality of teeth protruding from the first side of the anchoring device at a non-perpendicular angle relative to the anchoring device and into the first side of the panel.

15. The method of claim 11, fastening the anchoring device to the panel with a plurality of teeth each having a sharpened tip portion protruding from the first side of a plate member of the anchoring device and disposed about a screw aperture thereof, the plurality of teeth oriented at a non-perpendicular angle relative to the plate member and extending only partially into the first side of the panel.

16. The method of claim 15, forming the anchoring device locating indicium as a depression on the second side of the panel in alignment with the aperture of the anchoring device.

17. The method of claim 11, forming the anchoring device locating indicium on the second side of the panel while fastening the anchoring device on the first side thereof.

18. The method of claim 11, feeding the anchoring device from a magazine into a position between the transfer punch and the die before fastening the anchoring device onto the panel.

19. The method of claim 18, severing the anchoring device from a strip of anchoring devices disposed in the magazine before fastening the anchoring device onto the panel.

20. A method for fastening an anchoring device having a threaded depression onto a refrigerator panel devoid of openings, comprising:
fastening a side of the anchoring device opposite the threaded depression thereof to a backside of the refrigerator panel;
forming an anchoring device locating indicium depression on a front side of the refrigerator panel in alignment with the threaded depression of the anchoring device without forming an opening through the panel.

21. The method of claim 20, forming the anchoring device locating indicium depression while fastening the anchoring device.

22. The method of claim 21, commencing formation of the anchoring device indicium depression after the anchoring device is partially fastened to the refrigerator panel.

23. The method of claim 20, fastening the anchoring device onto the refrigerator panel by driving it with a transfer punch, forming the anchoring device locating indicium on the refrigerator panel by protruding a divot punch through a die disposed against the front side of the refrigerator panel.

24. A method for installing an anchoring device onto a refrigerator panel devoid of openings, comprising:
fastening the anchoring device onto the refrigerator panel by driving a plurality of teeth protruding from the anchoring device into a backside of the refrigerator panel without penetrating the teeth through an opposite front side of the panel;
forming an anchoring device locating indicium on the front side of the refrigerator panel opposite the anchoring device without forming an opening through the panel;
commencing formation of the anchoring device locating indicium after the teeth of the anchoring device are partially driven into the refrigerator panel.

25. The method of claim 24, forming the anchoring device locating indicium as a depression in the front side of the refrigerator panel in alignment with a threaded helical depression protruding from the anchoring device away from the backside of the refrigerator panel.

26. The method of claim 25, fastening the anchoring device onto the refrigerator panel by driving it with a transfer punch, forming the anchoring device locating indicium on the refrigerator panel by protruding a divot punch through a die disposed against the front side of the refrigerator panel.

* * * * *